June 7, 1938. R. E. BRESSLER Re. 20,749
FUEL BURNING SYSTEM
Original Filed June 27, 1931 2 Sheets-Sheet 1
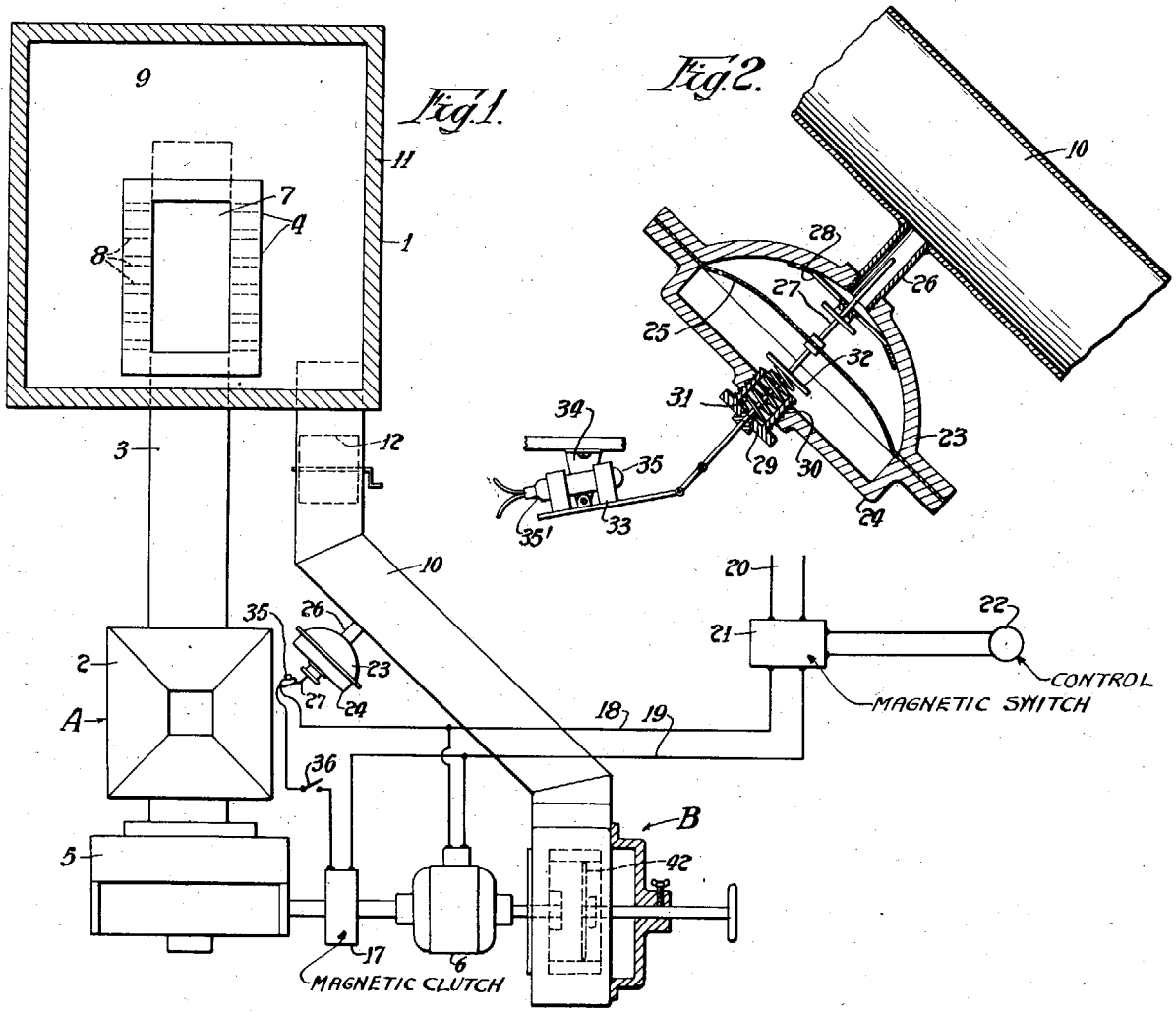
Inventor:
Robert E. Bressler,
By: Arthur W. Nelson
Attorney.

June 7, 1938. R. E. BRESSLER Re. 20,749
FUEL BURNING SYSTEM
Original Filed June 27, 1931 2 Sheets-Sheet 2
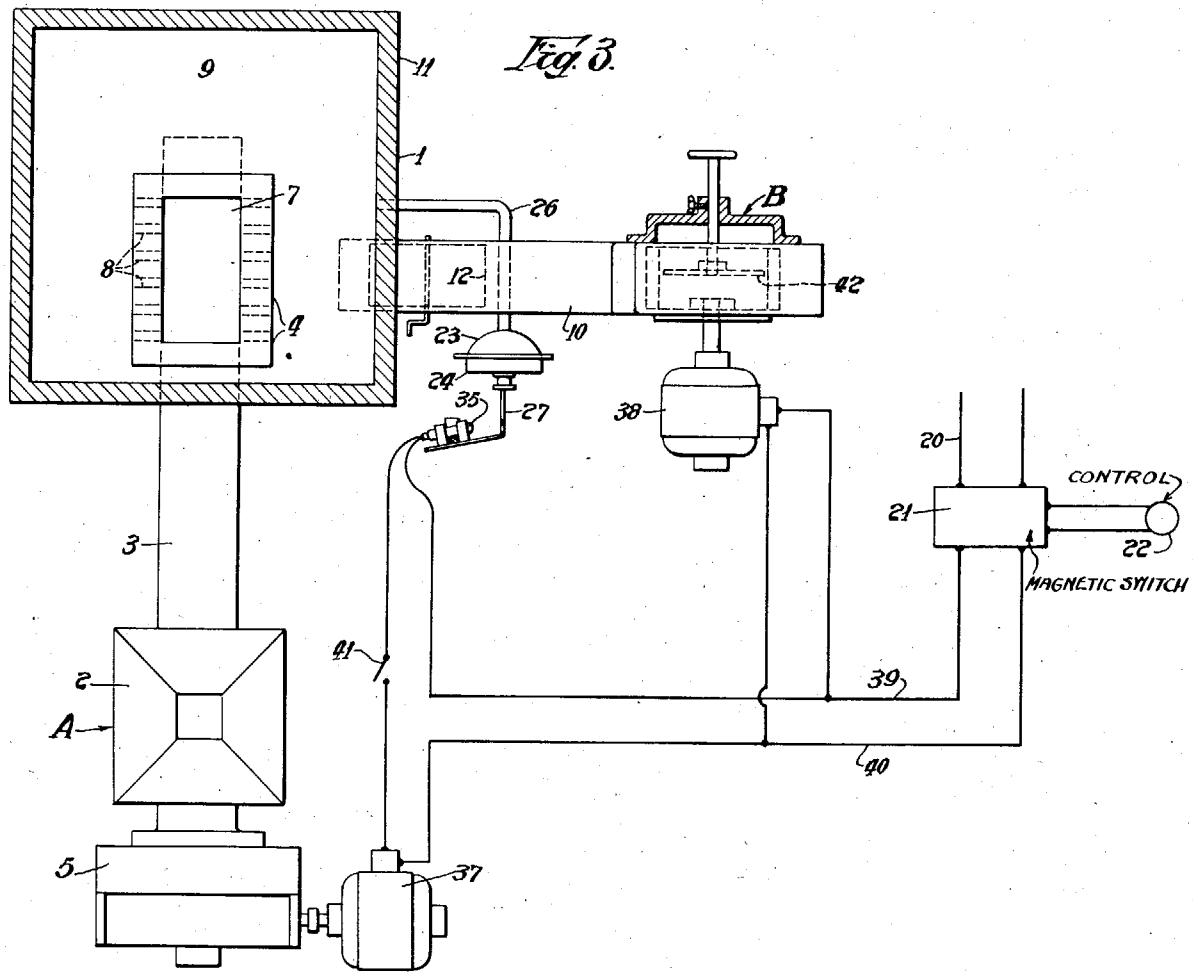
Inventor:
Robert E. Bressler,
By: Arthur McGilvore
Attorney.

Reissued June 7, 1938

Re. 20,749

UNITED STATES PATENT OFFICE 20,749

FUEL BURNING SYSTEM

Robert E. Bressler, Oregon, Ill.

Original No. 1,996,230, dated April 2, 1935, Serial No. 547,303, June 27, 1931. Application for reissue February 17, 1937, Serial No. 126,202

8 Claims. (Cl. 110—44)

My invention relates to an improved method and arrangement for economically and efficiently burning fuel such as coal and is particularly useful and efficient in connection with stoker fed furnaces where a power driven stoker and a power driven blower deliver coal and air to a burner or retort within a furnace.

An important object of the invention is to provide improved arrangement and control whereby the volume of air may be exactly and automatically proportioned to the requirement of the amount of fuel being burned and in such manner that the volume or amount of coal to be burned through any length of time will be controlled through control of the volume of air, thus making it possible to feed any given quantity of coal to the fire through the control of the volume of air.

A further object is to provide an arrangement and control which gives a means for variable adjustment of depth of fuel bed on the stoker to suit the demands of the heating or power plant under all conditions.

Another object is to provide a method of control of combustion conditions which is entirely independent of the operator and which provides air in only sufficient quantities for the proper and efficient combustion of the fuel fed to the furnace.

A further object is to provide an arrangement and means whereby the air pressure in the air path from the blower to the burner will control the stoker operation in such a manner as to assure a predetermined fixed depth of fuel bed.

A still further object is to provide controlling apparatus for the stoker driving motor circuit whose operation is controlled by the static or back pressure in the air line caused by the resistance to the air flow through the fuel bed, together with manually adjustable means for limiting the volume of air delivered by the blower to the burner to thereby govern the rate of combustion and to assist in governing the amount of time that the feeding motor will operate.

A still further object is to provide a system in which the coal feeding stoker is always driven at the same rate by the driving motor and in which the operation of the motor is automatically controlled by the volume of air delivered to the burner by the blower.

In addition to the above specifically referred to features, the invention includes other features, all of which will become apparent from the following specification in connection with the drawings, on which drawings Figure 1 is a plan view more or less diagrammatic of the system involving the stoker mechanism, the blower, and the driving motor and control elements;

Figure 2 is an enlarged diametral section of the governor circuit controlling device; and Figure 3 is a plan view of the system showing a modified arrangement.

On the drawings, 1 represents the firebox of a furnace to be supplied by coal from the stoker structure A which may be of any well known design. The structure shown comprises a coal hopper 2 from which coal is fed to be received by a feed screw or other feed element (not shown) operating in the conduit 3 leading to the burner or retort 4 within the firebox, a speed reducing gear structure indicated by 5 being connected with the feed element and being adapted to be driven by an electric motor 6.

The burner or retort may be of any suitable construction to provide the chamber 7 for receiving the coal from the feed element and having tuyères or ports 8 for conducting air into the coal within the chamber 7 and on the dead plate 9 surrounding the chamber.

A blower structure B is connected by a duct 10 with the air space formed below the burner structure by a wall 11 and in this duct is interposed an adjustable damper 12. In the arrangement of Figure 1, the blower is driven by the motor 6, which serves also to drive the gearing 5 for the stoker mechanism, and a magnetic clutch 17 may be interposed between the motor and the gearing.

The current supply leads 18 and 19 for the motor are adapted for connection with the supply circuit 20 by a suitable magnetic switch indicated at 21, which may be of any well known construction, and the operation of the magnetic switch to connect the motor circuit with the supply circuit may be controlled by a device indicated at 22 which is thermally or pressure controlled. Where the furnace is used for heating purposes, the temperature of the heated space will determine the operation of the control device 22, and where the furnace is used for heating a boiler, the steam pressure may function to control the operation of the device.

The device for automatically controlling the operation of the stoker mechanism by the motor 6 is clearly shown in Figure 2. It comprises upper and lower housing sections 23 and 24 which secure between them the peripheral portion of a diaphragm 25. The chamber above the diaphragm is connected by a duct 26 with the air delivery duct 10 from the blower, as shown in the arrangement of Figures 1 and 2. A stem 27 is secured to the diaphragm at the central part thereof and has its upper end guided by a spider 28 secured to the housing 23 adjacent to the duct 26. The lower end of the stem extends through the head of a hollow plug 29 which has adjustable screw threaded support in the housing part 24. The plug receives a compression spring 31 whose one abutment is the head of the plug and whose other abutment may be a disc or collar 32 secured to the stem 27 of the diaphragm 25.

At its lower end the diaphragm stem connects with the end of a rock frame 33 pivoted on a bracket 34 and supporting a mercury switch tube 35. In the arrangement of Figure 1, the contacts of the switch 35 are connected in series in the supply circuit 18—19 which also includes the magnetic clutch 17, the motor 6 being connected directly with the supply circuit in advance of the switch contacts. To open or close the clutch circuit independently of the other switch contacts, a hand switch 36 may be included in the supply circuit 18—19.

In the modified arrangement of Figure 3, the magnetic clutch is dispensed with and the motor 37 is connected directly with the gearing 5 of the stoker mechanism, and a separate motor 38 is provided for driving the blower. The motor circuit controlling device instead of being connected with the air delivery duct from the blower is connected with the air space below the burner or retort. The motor 38 is connected directly with the current supply circuit 39—40 leading from the magnetic switch 21 and this circuit includes the motor 37 and the mercury switch 35, and if desired, a hand switch 41. The motors 37 and 38 are connected in parallel in the supply circuit.

The blower B is provided with air volume regulator means or air damper 42 which may be set for any desired volume of air supply for the burner.

Describing now the operation, when the pressure above the diaphragm 25 is insufficient to deflect the diaphragm against the pressure of the spring 31, the mercury switch 35 will be in its circuit closing position as indicated on Figure 2. However, when the spring is overcome by the pressure against the upper side of the diaphragm, the diaphragm will be deflected downwardly and the mercury switch will open the circuit controlled thereby. Suppose that the system is at rest with the thermal or pressure control device 22 holding the magnetic switch 21 open so that there will be no current flow to the system. Then, in the arrangement of Figure 1, the motor 6 is disconnected from the circuit and also the magnetic clutch 17. Should the device 22 be now rendered effective by heat or pressure to cause closure of the magnetic switch, the circuit 18—19 will be connected with the current supply circuit 20 and the motor 6 will operate to drive the blower so that air will be charged into the furnace below the burner. The hand switch 36 being closed and the mercury switch 35 being also closed, the magnetic clutch will connect the motor 6 for driving the stoker mechanism.

As the air from the blower enters the space below the burner or retort and flows therefrom through the tuyère passages 8, it encounters more or less resistance, depending upon the depth of the fuel bed through which the air must travel. If, when the system is started, there is very little coal on the burner and the resistance to the air flow is correspondingly low, the static or back pressure created in the blower duct will be insufficient to deflect the diaphragm 25 and the switch 35 remains closed and the motor continues to drive the stoker. As the supply of coal to the burner increases, the resistance to the air increases and eventually the static or back pressure will become sufficient to deflect the diaphragm and to cause movement of the mercury switch to open the magnetic clutch circuit so that the stoker will no longer be operated and coal feed will stop. As the coal burns away on the burner, the resistance to air flow through the fuel body correspondingly diminishes and the reduced static or back pressure will no longer be able to hold the diaphragm against the pressure of the spring 31 and the diaphragm is therefore shifted to cause reclosure of the mercury switch and reconnection of the magnetic clutch inserted so that the motor may again drive the stoker to feed fuel to the burner. If the damper 12 is omitted or has been set to be wide open, and the regulator 42 has been set for full operation of the blower, the furnace will be operating at maximum capacity, the coal bed on the burner affording the only resistance to the air flow, the adjustment of the diaphragm spring being such that under these conditions the static or back pressure will be sufficient to deflect the diaphragm to cause opening of the mercury switch only when the maximum amount of coal has been stoked to the burner.

As soon as some of the coal burns away and the back or static pressure is sufficiently reduced the diaphragm device again closes the circuit so that the fuel feed to the burner will be automatically maintained in proper proportion with the air delivered, or vice versa, the amount of air delivered will be in proper proportion to the amount of fuel delivered to the burner so that the most efficient combustion will result.

If it is not desired to work the furnace at full capacity, the regulator 42 is set to reduce the air volume delivered per unit of time to the burner, and under these conditions, the back or static pressure will become effective on the diaphragm before the maximum amount of fuel has been fed to the burner and the circuit controlling the operation of the stoker will be opened and held open until the fuel has been burned away sufficiently to reduce the resistance to the air flow to a point where the back or static pressure can no longer hold the diaphragm down. After setting of the regulator 42, the operation of the system will be entirely automatic, the volume of air being exactly and automatically proportioned to the requirement of the amount of fuel being burned and in such manner that the volume or amount of coal to be burned through any length of time will be automatically controlled through control of the volume of air, thus making it possible to feed any given quantity of coal to the fire through the control of the volume of air by means of the regulator 42. If a very low fire is desired, as for example, during the night, the regulator 42 is set for the necessary restriction of air delivery, and thereafter the diaphragm device will control the system so that the stoker will supply coal in proper proportion to the admitted air for efficient and complete combustion. Should the furnace or boiler deliver too much heat or too much pressure, the automatic controlling device 22 will function to disconnect the supply circuit until the heat or pressure has been properly reduced and it will cause reclosure of the circuit and the system will then proceed to operate under control of the diaphragm device in the manner explained.

Instead of using only the regulator 42 for controlling the air volume delivery by the blower B, the damper 12 could be used for accomplishing the same end, or both the damper and the regulator might be utilized. The regulator 42 may be set for a maximum air delivery under which the system is to be operated and the damper 12 then adjusted for the desired modification of the air delivery. When the damper is wide open, the system will operate at maximum capacity determined by the setting of the regulator 42, and if the damper is partially closed, its resistance to the air delivery will be added to the resistance of the fuel bed to the air flow therethrough and the back pressure will be built up more rapidly and the diaphragm will be deflected and the stoker driving motor disconnected from circuit with a shallower fuel bed on the burner than would be the case if the damper had not been adjusted to restrict the air flow, so that by adjusting the damper the volume of fuel delivered to the burner will be diminished and in accordance with the damper restricted air flow.

The volume of air delivered to the burner will control the amount of coal burned, and the operation of the diaphragm structure will determine the depth of the fuel bed on the burner. By adjusting the plug 29 and thereby the resistance effort of the spring 31 against deflection of the diaphragm 25, setting is readily made for the maximum static or back pressure at which the stoker motor is allowed to operate. Adjustment to increase this pressure will result in a deeper fuel bed and adjustment to decrease the pressure will result in a shallower bed. As more or less air is delivered to the burner, it will be necessary to readjust the spring tension on the diaphragm in order to maintain the same or a different depth of fuel bed, due to the fact that as more air is admitted to the burner, or forced through the burner, a greater resistance will be caused by the attempt to force a greater amount of air through the same depth of fuel bed, and conversely, less resistance will be created by forcing a smaller volume of air through a certain depth of fuel bed.

In the modified arrangement of Figure 3, where the motor 37 is connected directly with the reducing gearing 5 and the diaphragm device is connected with the air space below the burner, the operation is the same as for the arrangement of Figure 1, the diaphragm device responding to the static or back pressure to open the motor circuit after the stoker has delivered fuel to the burner in accordance with the setting of the damper 12 or regulator 42.

It will be noted that with my improved arrangement and control, no adjustment is required for the speed reducing mechanism 5, but the stoker is always driven at the same rate of speed whenever the motor operates. Likewise, the blower is always driven at the same rate of speed when the driving motor therefor is connected in circuit. If it is desired to stop the stoker at any time during operation of the system, the hand switch 36 (Figure 1) or the hand switch 41 (Figure 3) may be opened.

My improved system and method of burning fuel is very simple, and being entirely automatic, it requires very little attention, and it effects considerable saving in fuel and in operation costs.

I have shown practical and efficient embodiments of the features of my invention, but I do not desire to be limited to the exact details shown, as changes may be made in arrangement and operation without departing from the principles and scope of the invention as defined in the appended claims.

I claim as my invention:—

1. In combination, a retort adapted to have a bed of fuel thereon, an air chamber beneath said retort, a blower, a conduit connecting said blower and the air chamber to supply air through the fuel bed, a stoker, an electric driving motor operatively connected with said stoker, an electric circuit operatively connected with said motor, and means responsive to the resistance to air flow through the fuel bed adapted to start and stop said driving motor, said means including a diaphragm chamber operatively connected with said conduit, a spring-pressed diaphragm in said diaphragm chamber, and a switch in the electric circuit operatively connected with said diaphragm to be opened and closed thereby.

2. In combination, a retort adapted to have a bed of fuel thereon, an air chamber beneath said retort, a blower, a conduit connecting said blower and the air chamber to supply air through the fuel bed, a stoker, an electric driving motor operatively connected with said stoker, an electric circuit operatively connected with said motor, and means responsive to the resistance to air flow through the fuel bed adapted to start and stop said driving motor, said means including a diaphragm chamber operatively connected with confined space in which there is air for combustion furnished by said blower, a spring-pressed diaphragm in said diaphragm chamber, and a switch in the electric circuit operatively connected with said diaphragm to be opened and closed thereby.

3. In combination, a retort adapted to have a bed of fuel thereon, an air chamber beneath said retort, a blower, a conduit connecting said blower and the air chamber to supply air through the fuel bed, a stoker, an electric driving motor operatively connected with said stoker, an electric circuit operatively connected with said motor, and means responsive to the resistance to air flow through the fuel bed adapted to start and stop said driving motor, said means including a diaphragm chamber operatively connected with said air chamber beneath said retort, a diaphragm in said diaphragm chamber, and a switch in the electric circuit operatively connected with said diaphragm to be opened and closed thereby.

4. In combination, a retort adapted to have a bed of fuel thereon, an air chamber associated with said retort, a blower connected with the air chamber to supply air through the fuel bed, a stoker, an electric driving motor operatively connected with said stoker, an electric circuit operatively connected with said motor, and means responsive to the resistance to air flow through the fuel bed adapted to start and stop said driving motor, said means including a diaphragm chamber operatively connected with confined space in which there is air for combustion furnished by said blower, a diaphragm in said diaphragm chamber, and a switch in the electric circuit operatively connected with said diaphragm to be opened and closed thereby.

5. In combination with a burner, means operative to feed fuel to the burner to maintain a desired depth of fuel bed therein, a blower for providing air under pressure for passage through the fuel bed to support combustion of the fuel therein and which pressure changes with the changing condition of the fuel bed in the burning of the fuel, thus providing different pressure conditions, an electrical circuit for controlling the operation of said first mentioned means and said blower respectively, and means controlled by said different pressure conditions and operating through said circuit for entirely stopping and starting said first mentioned means without affecting the blower, and means in said circuit for controlling the operation of the blower.

6. In combination with a burner, means operative to feed fuel to the burner to maintain a desired depth of fuel bed therein, a blower for providing air under pressure for passage through the fuel bed to support combustion of the fuel and which pressure changes with the changing depth of the fuel bed in the burning of the fuel, thus providing different pressure conditions, an electrical circuit for said first mentioned means and said blower respectively, and means controlled by said different pressure conditions and operating through a part of said circuit for entirely stopping and starting said first mentioned means without affecting the blower, means operative in connection with the blower and independent of said circuit for controlling the burning rate of the fuel bed, and means in another part of said circuit for stopping and starting the blower.

7. In combination with a burner, means operative to feed fuel to the burner to maintain a desired depth of fuel bed therein, a motor for driving the same, a blower for providing air under pressure for passage through the fuel bed to support combustion of the fuel and which pressure changes with the changing depth of the fuel bed in the burning of the fuel, thus providing different pressure conditions, a second motor for driving the blower, electrical circuits for both motors, means controlled by said different pressure conditions and operating through one of said circuits for starting and entirely stopping the first mentioned motor without affecting the second one, and means included in said circuits for starting and stopping the second mentioned motor.

8. In combination with a burner, means operative to feed fuel to the burner to maintain a certain depth of fuel bed therein, a motor for driving the same, a blower for providing air under pressure for passage through the fuel bed to support combustion of the fuel and which pressure changes with the changing depth of the fuel bed in the burning of the fuel, thus providing different pressure conditions, a second motor for driving the blower, electrical circuits for both motors, means controlled by said different pressure conditions and operating through one of said circuits for starting and entirely stopping the first mentioned motor without affecting the second one, means associated with the blower but independent of its motor for controlling the burning rate of the fuel bed, and means included in said circuits for starting and stopping the second mentioned motor.

ROBERT E. BRESSLER.